United States Patent
Mehdinia et al.

(10) Patent No.: US 10,396,387 B2
(45) Date of Patent: Aug. 27, 2019

(54) CARBON NANOTUBE BASED MICROBIAL FUEL CELLS AND METHODS FOR GENERATING AN ELECTRIC CURRENT

(71) Applicants: Ali Mehdinia, Tehran (IR); Soheil Bahrebar, Tehran (IR)

(72) Inventors: Ali Mehdinia, Tehran (IR); Soheil Bahrebar, Tehran (IR)

(*) Notice: Subject to any disclaimer, the term of this patent is extended or adjusted under 35 U.S.C. 154(b) by 370 days.

(21) Appl. No.: 15/355,615

(22) Filed: Nov. 18, 2016

(65) Prior Publication Data

US 2018/0145364 A1    May 24, 2018

(51) Int. Cl.
| | | |
|---|---|---|
| *H01M 8/16* | (2006.01) | |
| *H01M 8/00* | (2016.01) | |
| *H01M 8/0239* | (2016.01) | |
| *H01M 4/90* | (2006.01) | |
| *H01M 4/96* | (2006.01) | |
| *H01M 4/92* | (2006.01) | |

(52) U.S. Cl.
CPC ........... *H01M 8/16* (2013.01); *H01M 4/9008* (2013.01); *H01M 4/92* (2013.01); *H01M 4/96* (2013.01); *H01M 8/002* (2013.01); *H01M 8/0239* (2013.01); *Y02E 60/527* (2013.01)

(58) Field of Classification Search
CPC ...... H01M 8/16; H01M 8/002; H01M 8/0239; H01M 4/9008; H01M 4/92; H01M 4/96
See application file for complete search history.

(56) References Cited

U.S. PATENT DOCUMENTS

| | | | | |
|---|---|---|---|---|
| 2006/0180796 A1* | 8/2006 | Adachi | ...................... | C09K 5/20 252/500 |
| 2009/0186393 A1* | 7/2009 | Baker | .................... | C12N 11/02 435/168 |
| 2010/0252443 A1* | 10/2010 | Borole | .................... | H01M 8/16 205/343 |
| 2010/0304458 A1* | 12/2010 | Bombelli | ............... | B82Y 10/00 435/168 |
| 2011/0039176 A1* | 2/2011 | Patolsky | ................. | H01M 4/90 429/428 |
| 2011/0236769 A1* | 9/2011 | Xie | ........................ | B82Y 30/00 429/401 |

(Continued)

OTHER PUBLICATIONS

Defense Advanced Research Projects Agency (DARPA), Glassy Carbon, https://www.darpa.mil/about-us/timeline/glassy-carbon, downloaded Mar. 7, 2019. (Year: 2019).*

*Primary Examiner* — Jayne L Mershon

(57) ABSTRACT

A microbial fuel cell and a method for generating an electric current using the microbial fuel cell are disclosed. The microbial fuel cell comprises a housing provided with multiple cell compartments. The cell compartments includes an anode compartment having an anode in a side, and a cathode compartment having a cathode on another side separated by an ion exchange membrane. The anode is a glassy carbon modified with a multi-walled carbon nanotube/tin oxide nanocomposite configured to attach a biocatalyst, immersed in a solution. The cathode is a platinum electrode immersed in another solution. The anode and cathode are electrically connected to one another via a resistance to generate electricity. The large specific surface area and biocompatibility of the multi-walled carbon nanotube/tin oxide nanocomposite anode in the microbial fuel cell increases the bacterial biofilm formation and charge transfer efficiency.

10 Claims, 5 Drawing Sheets

(56) References Cited

U.S. PATENT DOCUMENTS

| | | | |
|---|---|---|---|
| 2014/0377846 A1* | 12/2014 | Barkeloo | C12N 15/78 435/252.34 |
| 2015/0233001 A1* | 8/2015 | Reguera | C25B 15/08 205/637 |
| 2016/0024664 A1* | 1/2016 | Krauss | C25B 1/003 205/340 |

* cited by examiner

Table 1. Comparison of power densities of MFCs with different anodes

| Substrate | Anode | Bacteria | System configuration | Maximum power density (mW/m²) |
|---|---|---|---|---|
| Glucose | Carbon paper | GeobacterSPP (Firmicutes) | Two-chamber | 40.3 ± 3.9 |
| Glucose | Graphite | Saccharomyces cerevisiae | Two-chamber | 16 |
| Acetate | Carbon paper | G. sulfurreducens | Two-chamber | 48.4 ± 0.3 |
| Lactate | Carbon paper | Geobacter SPP | Two-chamber | 52 ± 4.7 |
| Ethanol | | Betaproteo bacterium | Two-chamber | 40 ± 2 |
| Cyctenin | Carbon paper | Gammaproteo and shewanellaaffinis(KMM3586) | Two chamber | 36 |
| Marine sediment reached in acetate | Graphite | Deltaproteo bacterium | Two-chamber | 14 |
| Marine sediment | Noncorroding graphite | | | 25.4_26.6 |
| Sewage sludge | Graphite with $Mn^{4+}$ | Escherichia coli | Single chamber | 91 |
| Sewage sludge | Graphite with neutral red (NR) | Escherichia coli | Single chamber | 152 |
| Sewage sludge | Platinum and polyanlineco-modified | Escherichia coli | Single chamber | 6000 |
| Glucose | Composite electrode (graphite/PTFE) | Escherichia coli | Single chamber | 760 |
| Glucose | Teflon treated carbon fiber paper | Electrochemically active bacteria | Two chamber (H-tyape MFC) | 15.2 |
| Lactose | " | " | " | 17.2 |
| Cellulose | Non-wet-prof carbon paper | Cellulose derading bacteria | " | 188 |
| Glucose | Graphite plates | Mixed culture | 2-chamber air-cathode MFC | 283 |
| Glucose | Carbon paper with PPY-CNTs | Escherichia coli | DCMFC | 228 |

FIG. 5

CARBON NANOTUBE BASED MICROBIAL FUEL CELLS AND METHODS FOR GENERATING AN ELECTRIC CURRENT

BACKGROUND OF THE INVENTION

Generally, a microbial fuel cell (MFC) is a device that converts chemical energy to electrical energy by the action of microorganisms. The microbial fuel cell (MFC), which is also termed as bio-batteries or biological fuel cells, utilize catalysts such as bacteria for oxidizing organic and inorganic matters to generate an electrical current.

The electrons produced by the bacteria through oxidation of the organic and inorganic matters are transferred to an anode or a negative pole, and then flows by a conductive material including a resistance to a cathode or a positive pole. By convection, a positive current from the positive pole is established to the negative pole, opposite of an electron current. Bio-batteries are constructed in different configurations with different materials.

The limited output of electrical power is a major limitation faced by the MFC. One of the main factors affecting the existing MFC is the type of materials used for the electrodes, type of catalyst and fuels. In general, bio batteries with several different fuels and anodes were made so far, generated low output power of 30-150 mW/m2. Although different materials have been utilized for making anodes and cathodes, the existing known materials implemented in the electrodes still provide lower power densities, and generate low electrical current when compared to the other existing fuel cells.

Therefore, there is a need in an art for increasing power density, and providing stable power supply using an economical fuel and generally available microorganism in the microbial fuel cells. There is also a need for simple, efficient, economical and biocompatible construction in the microbial fuel cell.

SUMMARY OF THE INVENTION

The present invention relates to a microbial fuel cell and a method for generating an electric current using the microbial fuel cell. In an embodiment, the microbial fuel cell comprises a housing having one or more cell compartments. The cell compartments includes an anode compartment having an anode in a side, and a cathode compartment having a cathode on another side separated by an ion exchange membrane. In one embodiment, the anode is a glassy carbon modified with a multi-walled carbon nanotube/tin oxide nanocomposite configured to attach a biocatalyst, immersed in a solution. In one embodiment, the cathode is a platinum electrode immersed in another solution. In an embodiment, the anode and cathode are electrically connected to one another via a resistance to generate electricity.

In one embodiment, the housing is a H-shaped glass cell comprising anode compartment and cathode compartment separated by the ion exchange membrane. In one embodiment, the ion exchange membrane is a cation exchange membrane. In another embodiment, the cation exchange membrane is a sulfonated tetrafluoroethylene based fluoropolymer-copolymer. In one embodiment, the diameter of the ion exchange membrane is 1.5 cm.

In an embodiment, the anode compartment is filled with a solution comprising glucose. In one embodiment, the cathode compartment is filled with a solution comprising hexacyano ferrate. In an embodiment, the biocatalyst comprises a plurality of *Escherichia coli* bacteria. In one embodiment, the bacteria is attached to the anode oxidize the glucose in the anode compartment. In an embodiment, the microbial fuel cell further comprises power density greater than 1400 mW/m$^2$.

One aspect of the present disclosure is directed to a microbial fuel cell, comprising: a housing comprising one or more cell compartments with an anode compartment having an anode in a side, and a cathode compartment having a cathode on another side separated by an ion exchange membrane; wherein the anode is a glassy carbon coated with a multi-walled carbon nanotube/tin oxide nanocomposite configured to attach a biocatalyst, immersed in a solution and the cathode is a platinum electrode immersed in another solution, and the anode and cathode are electrically connected to one another via a resistance to generate electricity. One aspect of the present disclosure is directed to a method for generating an electric current, comprising: (a) providing a microbial fuel cell of claim 1; and (b) introducing a nutrient medium to the anode compartment of the microbial fuel cell.

In one embodiment, the housing is an H-shaped glass cell comprising anode compartment and cathode compartment separated by the ion exchange membrane. In another embodiment, the ion exchange membrane is a cation exchange membrane. In one embodiment, the diameter of the ion exchange membrane is 1.5 cm. In another embodiment, the cation exchange membrane is a sulfonated tetrafluorethylene based fluoropolymer-copolymer. In one embodiment, the anode compartment is filled with the solution comprising glucose. In another embodiment, the cathode compartment is filled with the solution comprising hexacyano ferrate.

In one embodiment, the biocatalyst comprises a plurality of *Escherichia coli* bacteria. In another embodiment, the bacteria is attached to the anode oxidize the glucose in the anode compartment. In another embodiment, the microbial fuel cell further comprises power density greater than 1400 mW/m2.

One aspect of the present disclosure is directed to a method for generating an electric current, comprising: (a) providing a microbial fuel cell, comprising: a housing comprising one or more cell compartments with an anode compartment having an anode in a side, and a cathode compartment having a cathode on another side separated by an ion exchange membrane; wherein the anode is a glassy carbon coated with a multi-walled carbon nanotube/tin oxide nanocomposite configured to attach a biocatalyst, immersed in a solution and the cathode is a platinum electrode immersed in another solution, and the anode and cathode are electrically connected to one another via a resistance to generate electricity; and (b) introducing a nutrient medium to the anode compartment of the microbial fuel cell.

In one embodiment, the nutrient medium comprises glucose. In another embodiment, the biocatalyst is attached to the anode oxidizes the glucose in the anode compartment. In one embodiment, the exchange of ions is done via the ion exchange membrane in the anode compartment and the cathode compartment of the housing.

Another aspect of the present disclosure is directed to a method of preparing anode of claim 1, comprising: obtaining multi-walled carbon nanotube; oxidizing the multi-walled carbon nanotube surface to produce carboxylic acid groups; introducing tin oxide on the multi-walled carbon nanotube surface, wherein the tin oxide adsorbed multi-walled carbon nanotube surface to produce multi-walled carbon nanotube and tin oxide solution, and coating glassy carbon anode surface with the multi-walled carbon nanotube and tin oxide solution to produce anode for the microbial fuel cell. In one embodiment, the method further comprises removal of residual metals in the obtained multi-walled carbon nanotube.

In an embodiment, a method for generating an electric current comprises a step for providing the microbial fuel cell. In one embodiment, the method further comprises a step for introducing a nutrient medium to the anode compartment of the microbial fuel cell. In one embodiment, the nutrient medium comprises glucose. In an embodiment, the biocatalyst is attached to the anode oxidizes the glucose in the anode compartment. In another embodiment, the exchange of ions is done via the ion exchange membrane in the anode compartment and the cathode compartment of the housing.

The present invention further relates to a method of preparing the anode electrode for the microbial fuel cells. In one embodiment, the method comprises a step of obtaining the multi-walled carbon nanotube, and removal of residual metals in the obtained multi-walled carbon nanotube. In next step, the surface of the multi-walled carbon nanotube is oxidized to produce carboxylic acid groups. Further, in next step, tin oxide is introduced on the multi-walled carbon nanotube surface. The tin oxide adsorbed multi-walled carbon nanotube surface to produce multi-walled carbon nanotube and tin oxide solution. In final step, the glassy carbon anode surface is introduced and coated with the multi-walled carbon nanotube and tin oxide solution to produce anode for microbial fuel cell.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 5 illustrates a comparison table of power densities of MFCs with different anodes.

DETAILED DESCRIPTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention generally relates to microbial fuel cell, and more specifically the invention relates to increase the power density of the microbial fuel cell using carbon nanotube/tin oxide nanocomposite.

Figure 1:
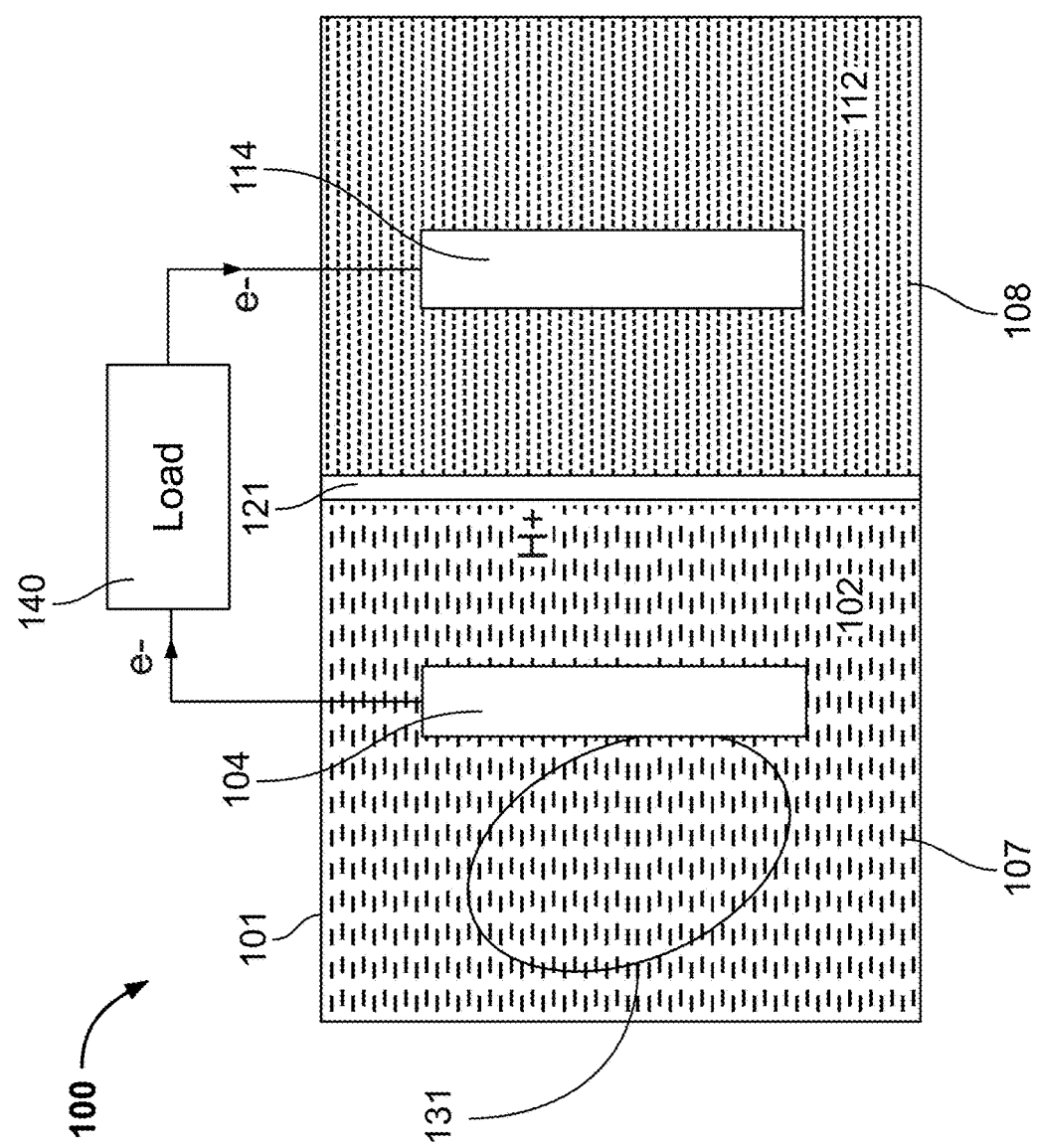
FIG. 1 illustrates a schematic view of a microbial fuel cell according to an embodiment.

The present invention relates to a microbial fuel cell and a method for generating an electric current using the microbial fuel cell. Referring to FIG. 1, a microbial fuel cell 100 comprises a housing 101 having one or more cell compartments. The cell compartments includes an anode compartment 102 having an anode 104 in a side, and a cathode compartment 112 having a cathode 114 on another side separated by an ion exchange membrane 121. In one embodiment, the anode 104 is a glassy carbon modified with a multi-walled carbon nanotube/tin oxide nanocomposite comprising carbon nanotube/tin oxide nanocomposite configured to attach a biocatalyst 131, immersed in a solution. In one embodiment, the cathode 114 is a platinum electrode immersed in another solution. In an embodiment, the anode 104 and cathode 114 are electrically connected to one another via a resistance 140 to generate electricity.

In one embodiment, the housing 101 is an H-shaped glass cell comprising anode compartment 102 and cathode compartment 112 separated by the ion exchange membrane 121. In one embodiment, the ion exchange membrane 121 is a cation or proton ($H^+$) exchange membrane. In another embodiment, the cation or proton ($H^+$) exchange membrane is a Nafion membrane or sulfonated tetrafluorethylene based fluoropolymer-copolymer. In one embodiment, the diameter of the ion exchange membrane is 1.5 cm.

In an embodiment, the anode compartment 102 is filled with a solution comprising glucose 107. In one embodiment, the cathode compartment is filled with a solution comprising hexacyano ferrate 108. In an embodiment, the biocatalyst 131 comprises a plurality of *Escherichia coli* bacteria. In one embodiment, the bacteria is attached to the anode oxidize the glucose in the anode compartment 102. In an embodiment, the microbial fuel cell 100 further comprises power density greater than 1400 $mW/m^2$. In one embodiment, the higher power density is generated by connecting multiple microbial fuel cells 100 in series.

One aspect of the present disclosure is directed to a microbial fuel cell, comprising: a housing comprising one or more cell compartments with an anode compartment having an anode in a side, and a cathode compartment having a cathode on another side separated by an ion exchange membrane; wherein the anode is a glassy carbon coated with a multi-walled carbon nanotube/tin oxide nanocomposite configured to attach a biocatalyst, immersed in a solution and the cathode is a platinum electrode immersed in another solution, and the anode and cathode are electrically connected to one another via a resistance to generate electricity.

In an embodiment, a method for generating an electric current comprises a step for providing the microbial fuel cell 100 shown in FIG. 1. In one embodiment, the method further comprises a step for introducing a culture medium or a nutrient medium to the anode compartment of the microbial fuel cell. In another embodiment, the nutrient medium comprises glucose 107. In an embodiment, the biocatalyst 131 is attached to the anode oxidizes the glucose 107 in the anode compartment. In another embodiment, the exchange of ions is done via the ion exchange membrane 121 in the anode compartment 102 and the cathode compartment 112 of the housing 101.

In various embodiments, a method of preparing the anode 104 electrode for the microbial fuel cells 100 is disclosed. In one embodiment, the method comprises a step of obtaining the multi-walled carbon nanotube, and removal of residual metals in the obtained multi-walled carbon nanotube. In next step, the surface of the multi-walled carbon nanotube is oxidized to produce carboxylic acid groups.

Further, in next step, tin oxide is introduced on the multi-walled carbon nanotube surface. The tin oxide adsorbed multi-walled carbon nanotube surface to produce multi-walled carbon nanotube and tin oxide solution. In final step, the glassy carbon anode surface is introduced and coated with the multi-walled carbon nanotube and tin oxide solution to produce anode 104 for microbial fuel cell 100.

The microbial fuel cell (MFC) 100 according to the present invention enhances the power density without the use of toxic chemicals, developed by using carbon nanotube/tin oxide nanocomposite as the anode 102. Carbon nanotube/tin oxide nanocomposite also represents an approving property for the anode materials in the MFCs 100. The improved performance of the MFC 100 is due to the large specific surface area of the carbon nanotube/tin oxide nanocomposite, and good biocompatibility, which increases the bacterial biofilm formation and charge (e) transfer efficiency. One aspect of the present disclosure is directed to a method for generating an electric current, comprising: (a) providing a microbial fuel cell of claim 1; and (b) introducing a nutrient medium to the anode compartment of the microbial fuel cell.

The MFC 100 could be used as a power source for temperature and humidity sensors, which requires low energy source. It is also used for wastewater treatment by oxidizing organic matters in the wastewater by the biocatalyst 131 such as bacteria. It could be used for different sensors with low power requirement in the sub-sea, or other places as a replacement for other power sources such as batteries.

Another aspect of the present disclosure is directed to a method of preparing the anode of claim 1. The method comprises obtaining multi-walled carbon nanotube; oxidizing the multi-walled carbon nanotube surface to produce carboxylic acid groups; introducing tin oxide on the multi-walled carbon nanotube surface, wherein the tin oxide adsorbed multi-walled carbon nanotube surface to produce multi-walled carbon nanotube and tin oxide solution, and coating glassy carbon anode surface with the multi-walled carbon nanotube and tin oxide solution to produce anode for the microbial fuel cell. In one embodiment, the method further comprises removal of residual metals in the obtained multi-walled carbon nanotube.

The invention is further explained in the following examples, which however, are not to be construed to limit the scope of the invention.

EXAMPLES

Example—1

In an experiment, a two-compartment glass cell was constructed with nafion as a mediator or ion exchange membrane. Glassy carbon electrode was used as anode, and platinum electrode was used as cathode. The constructed fuel cell consists of two 100 ml glass compartments as the anode and cathode chambers, and Nafion 117 was used for separation of two chambers. The diameter of connectors of the two-chamber was about 1.5 cm. The anode chamber was inoculated with anaerobic sludge of 100 ml, and the cathode chamber contains a solution of 0.1M hexacyano ferrate. Glassy carbon electrode and platinum were used as working electrode with surface area of 0.314 cm². To connect the electrodes to an external circuit resistance, copper wire was used. Carbon nanotube/tin oxide was used for coating of glassy carbon electrode.

For preparing the electrode, multi-walled carbon nanotubes (MWCNTs) were obtained, and activated by acid wash for removing the residual metals in their structure. The MWCNTs was modified by oxidation of the surface of it to produce carboxylic acid groups. Afterwards, tin oxide ($SnO_2$) was adsorbed on the surface of the functionalized MWCNTs. The electrode with MWCNTs/$SnO_2$ was fabricated with 5% PTFE solution as the binder. The modified electrode was prepared by dropping the solution of MWCNTs/$SnO_2$ onto the glassy carbon electrode. After 48 h, a redox peak was observed in the voltammogram, which is related to attachment of cytochrome-c membrane to the anode electrode surface due to the adhesion and growth of microorganisms on the surface of the electrode.

Example—2

Figure 2:
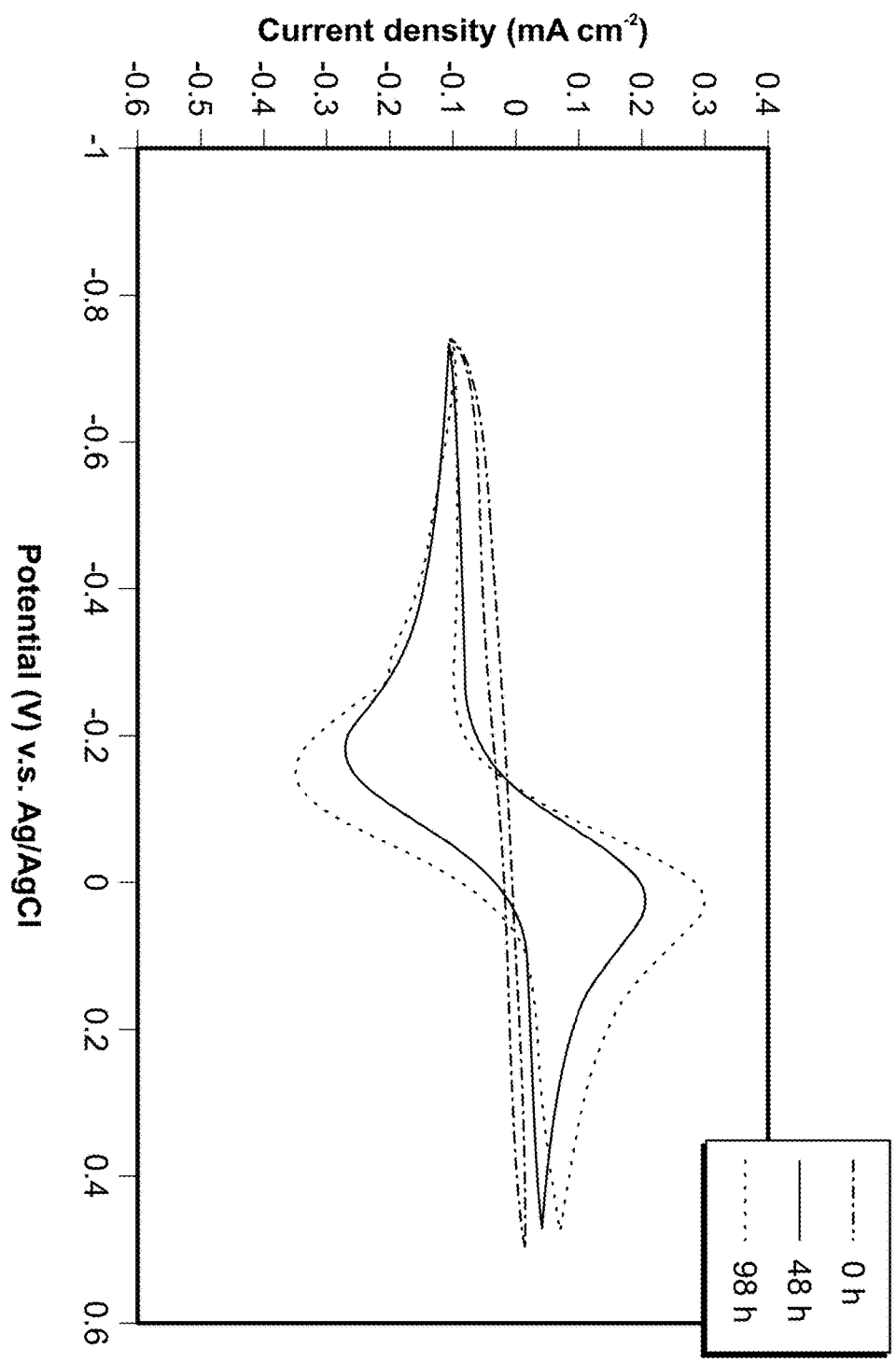
FIG. 2 illustrates a graph of cyclic voltammograms of a nanocomposite anode after 0 h, 48 h, and 90 h.
Figure 3:
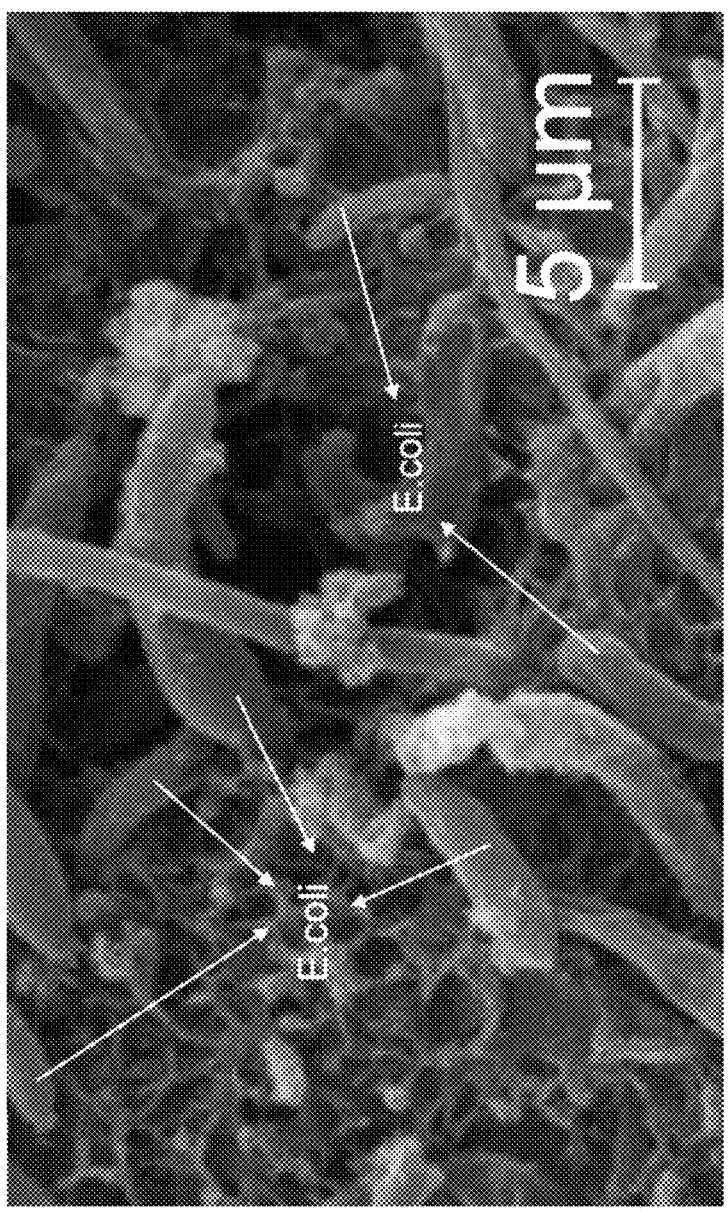
FIG. 3 illustrates a scanning electron microscopic (SEM) image on the anode surface after 72 h.

Biocompatibility of carbon nanotube/tin oxide composite against *E. coli*, was tested by cyclic voltammetry and scanning electron microscopy. In cyclic voltammetry, voltammograms were recorded in three interval including, 0 h, 48 h, and 72 h. As shown in FIG. 2, the cyclic voltammograms of the nanocomposite MWCNTs-$SnO_2$/GCE after 0 h, 48 h, and 90 h immersed in phosphate buffer with glucose (1 g $L^{-1}$) and *E. coli* bacteria. No redox peaks were observed at the beginning of substrate injection. After 48 h, a redox peak was observed in the voltammogram, which is related to the attachment of cytochrome C membrane to the anode electrode surface that is result of adhesion and growth of microorganisms on the surface of the electrode. As shown in FIG. 3, a scanning electron microscopic image on the surface of the anode electrode, showing biofilm attachment on the MWCNTs-$SnO_2$ coated on glassy carbon electrode (GCE). After 72 h, colonization of microorganisms is achieved due to the biocompatibility of the nanocomposite with respect to the *E. coli* bacteria.

Example—3

Figure 4:
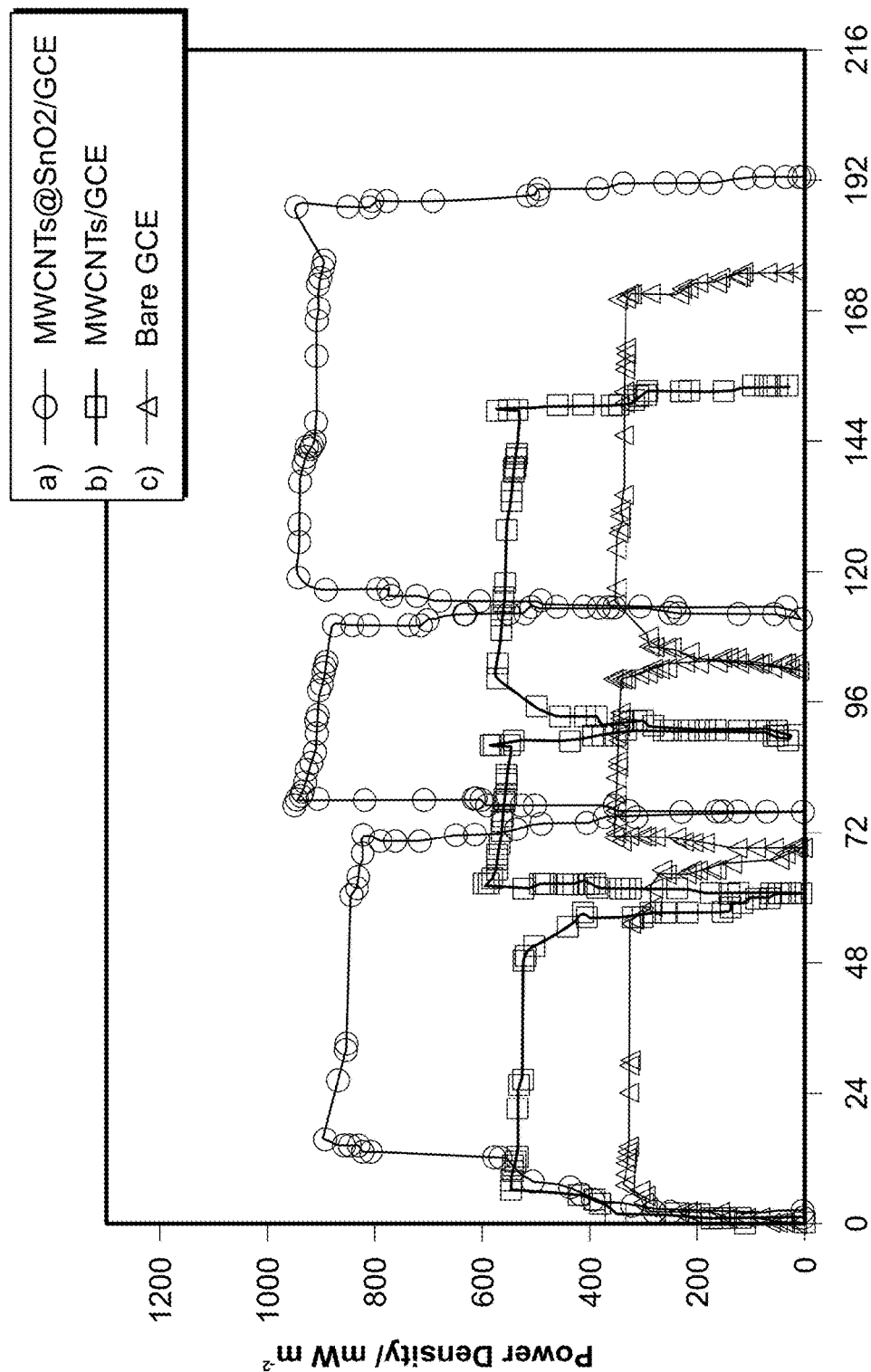
FIG. 4 illustrates a graph of output power density of the microbial fuel cell incorporated with the nanocomposite anode comparing bare glassy carbon anode, bare carbon tube anode, and nanocomposite anode.

FIG. 4 shows the power density of the fuel in terms of current density in various modified glassy carbon electrodes such as MWCNTs-$SnO_2$ coated on glassy carbon electrode (GCE), MWCNTs coated on GCE, and bare GCE. The power density was recorded with an external resistance of 550 ohm. The maximum power density of the electrode modified with tin oxide/carbon nanotube was 1420 mW/m², which is related to the current density of I=2.8 A/m² and the potential of V=0.508 V.

A novel microbial fuel cell was designed based on nanocomposite of carbon nanotube/$SnO_2$ as anode material. By an accessible microorganism such as *E. coli* bacteria and low cost fuel such as glucose, high power density was obtained in comparison with many similar products introduced as MFC, as shown in FIG. 5. Power density obtained in this work was compared with the prior arts, the normal power densities of the known MFCs are between 40-700 mW/m², where the proposed design of MFC, 1420 mW/m² was obtained. The maximum power density known from the literature was 6000 mW/m² for platinum and polyaniline co-modified electrode. However, this MFC with a platinized anode increased the cost of cell design.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A microbial fuel cell, comprising:
a housing comprising one or more cell compartments with an anode compartment having an anode in a side, and a cathode compartment having a cathode on another side separated by a cation exchange membrane, wherein the cation exchange membrane is a sulfonated tetrafluorethylene based fluoropolymer-copolymer;
wherein the anode is a glassy carbon coated with a multi-walled carbon nanotube/tin oxide nanocomposite configured to attach a plurality of *Escherichia coli* bacteria, immersed in a solution containing glucose and the cathode is a platinum electrode immersed in another solution containing hexacyano ferrate, and the anode and cathode are electrically connected to one another via a resistance to generate electricity, wherein the power density of the microbial fuel cell is greater than 1400 mW/m$^2$.

2. The microbial fuel cell of claim 1, wherein the housing is a glass cell comprising anode compartment and cathode compartment separated by the ion exchange membrane.

3. The microbial fuel cell of claim 1, wherein the diameter of the cation exchange membrane is 1.5 cm.

4. The microbial fuel cell of claim 1, wherein the bacteria attached to the anode oxidizes the glucose in the anode compartment.

5. A method for generating an electric current, comprising:
providing the microbial cell of claim 1, and
introducing a nutrient medium to the anode compartment of the microbial fuel cell.

6. The method of claim 5, wherein the nutrient medium comprises glucose.

7. The method of claim 5, wherein the biocatalyst is attached to the anode oxidizes the glucose in the anode compartment.

8. The method of claim 5, wherein the exchange of ions is done via the ion exchange membrane in the anode compartment and the cathode compartment of the housing.

9. A method of preparing anode of claim 1, comprising:
obtaining multi-walled carbon nanotube;
oxidizing the multi-walled carbon nanotube surface to produce carboxylic acid groups;
introducing tin oxide on the multi-walled carbon nanotube surface, wherein the tin oxide adsorbed multi-walled carbon nanotube surface to produce multi-walled carbon nanotube and tin oxide solution, and
coating glassy carbon anode surface with the multi-walled carbon nanotube and tin oxide solution to produce anode for the microbial fuel cell.

10. The method of claim 9, further comprising removal of residual metals in the obtained multi-walled carbon nanotube.

* * * * *